(12) United States Patent
Sakuma et al.

(10) Patent No.: US 12,398,062 B2
(45) Date of Patent: Aug. 26, 2025

(54) METHOD FOR PRODUCING OPTICAL FIBER BASE MATERIAL, AND OPTICAL FIBER BASE MATERIAL

(71) Applicant: SUMITOMO ELECTRIC INDUSTRIES, LTD., Osaka (JP)

(72) Inventors: Hirotaka Sakuma, Osaka (JP); Yuki Kawaguchi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 277 days.

(21) Appl. No.: 18/008,471

(22) PCT Filed: Jun. 17, 2021

(86) PCT No.: PCT/JP2021/023094
§ 371 (c)(1),
(2) Date: Dec. 6, 2022

(87) PCT Pub. No.: WO2022/004415
PCT Pub. Date: Jan. 6, 2022

(65) Prior Publication Data
US 2023/0202904 A1    Jun. 29, 2023

(30) Foreign Application Priority Data
Jul. 3, 2020    (JP) ................................. 2020-115688

(51) Int. Cl.
*C03B 37/012*    (2006.01)
*C03B 37/014*    (2006.01)

(52) U.S. Cl.
CPC .. *C03B 37/01228* (2013.01); *C03B 37/01473* (2013.01); *C03B 2201/50* (2013.01); *C03B 2201/54* (2013.01)

(58) Field of Classification Search
None
See application file for complete search history.

(56) References Cited

U.S. PATENT DOCUMENTS

| | | |
|---|---|---|
| 9,036,972 B2 | 5/2015 | Tamura et al. |
| 2003/0150242 A1 | 8/2003 | Caplen et al. |
| 2007/0198190 A1 | 8/2007 | Bauer et al. |
| 2012/0198892 A1 | 8/2012 | Tamura et al. |
| 2014/0127507 A1 | 5/2014 | Haruna et al. |

(Continued)

FOREIGN PATENT DOCUMENTS

| | | | | |
|---|---|---|---|---|
| EP | 0940373 A2 | * | 9/1999 | ............ C03C 25/68 |
| EP | 1167307 A1 | * | 1/2002 | ....... C03B 37/01228 |

(Continued)

*Primary Examiner* — Queenie S Dehghan
(74) *Attorney, Agent, or Firm* — Faegre Drinker Biddle & Reath LLP

(57) ABSTRACT

A method for manufacturing an optical fiber preform includes: adding an alkali metal element or an alkaline earth metal element to an inner surface of a glass pipe made of silica-based glass; reducing a diameter of the glass pipe after the adding; etching an inner surface of a continuous section of the glass pipe in a longitudinal direction after the reducing; and collapsing the glass pipe after the etching. At least one of the adding, the reducing, the etching, and the collapsing includes performing a local etching on an inner surface of a section of the glass pipe that is shorter than the continuous section.

7 Claims, 3 Drawing Sheets

(56) References Cited

U.S. PATENT DOCUMENTS

2014/0370287 A1   12/2014   Tamura et al.
2017/0305781 A1   10/2017   Haruna et al.
2020/0247710 A1    8/2020   Tanaka et al.
2022/0283363 A1*  9/2022   Logunov ................. C03C 25/68

FOREIGN PATENT DOCUMENTS

| EP | 2484643 A1 * | 8/2012 | ....... C03B 37/01228 |
|----|----|----|----|
| JP | 2010-520140 A | 6/2010 | |
| WO | WO-2004/020357 A2 | 3/2004 | |
| WO | WO-2005/021344 A1 | 3/2005 | |
| WO | WO-2008/106046 A1 | 9/2008 | |
| WO | WO-2013/105459 A1 | 7/2013 | |
| WO | WO-2013/111470 A1 | 8/2013 | |
| WO | WO-2016/114313 A1 | 7/2016 | |
| WO | WO-2019/044833 A1 | 3/2019 | |

* cited by examiner

METHOD FOR PRODUCING OPTICAL FIBER BASE MATERIAL, AND OPTICAL FIBER BASE MATERIAL

TECHNICAL FIELD

The present disclosure relates to a method for manufacturing an optical fiber preform and an optical fiber preform.

The present application claims the benefit of the priority based on Japanese Patent Application No. 2020-115688, filed on Jul. 3, 2020, the entire contents disclosed in the application is incorporated herein by reference.

BACKGROUND ART

When the core portion formed of the silica-based glass includes an alkali metal element or an alkaline earth metal element, viscosity of the core is reduced and rearrangement of the glass is promoted when the optical fiber preform is drawn to manufacture the optical fiber. Therefore, the transmission loss caused by the Rayleigh scattering of the optical fiber is reduced. As a result, the transmission loss can be reduced.

Patent Literatures 1, 2, and 3 describe methods of adding a metal element or an alkaline earth metal element to a core portion of an optical fiber preform by a diffusion method.

CITATION LIST

Patent Literature

Patent Literature 1: WO2004/020357
Patent Literature 2: WO2005/021344
Patent Literature 3: WO2013/111470

SUMMARY OF INVENTION

A method for manufacturing an optical fiber preform according to the present disclosure includes: adding an alkali metal element or an alkaline earth metal element to an inner surface of a glass pipe made of silica-based glass; reducing a diameter of the glass pipe after the adding; etching an inner surface of a continuous section of the glass pipe in a longitudinal direction after the reducing; and collapsing the glass pipe after the etching. At least one of the adding, the reducing, the etching, and the collapsing includes performing a local etching on an inner surface of a section of the glass pipe that is shorter than the continuous section.

A method for manufacturing an optical fiber preform according to the present disclosure includes: adding an alkali metal element or an alkaline earth metal element to an inner surface of a glass pipe made of silica-based glass; reducing a diameter of the glass pipe after the adding; etching an inner surface of a continuous section of the glass pipe in a longitudinal direction after the reducing; collapsing the glass pipe after the etching, performing a local etching on an inner surface of a section of the glass pipe that is shorter than the continuous section at least one of between the adding and the reducing, between the reducing and the etching, and between the etching and the collapsing.

The optical fiber preform according to the present disclosure includes: a core portion made of silica-based glass and including an alkali metal element or an alkaline earth metal element. A concentration of the alkali metal element or the alkaline earth metal element in the core portion differs at a portion of a longitudinal direction, with respect to a place other than the portion.

The optical fiber preform according to the present disclosure includes: a core portion made of silica-based glass and including an alkali metal element or an alkaline earth metal element. The core portion includes bromine in a portion or all in a longitudinal direction.

DESCRIPTION OF EMBODIMENTS

Figure 1:
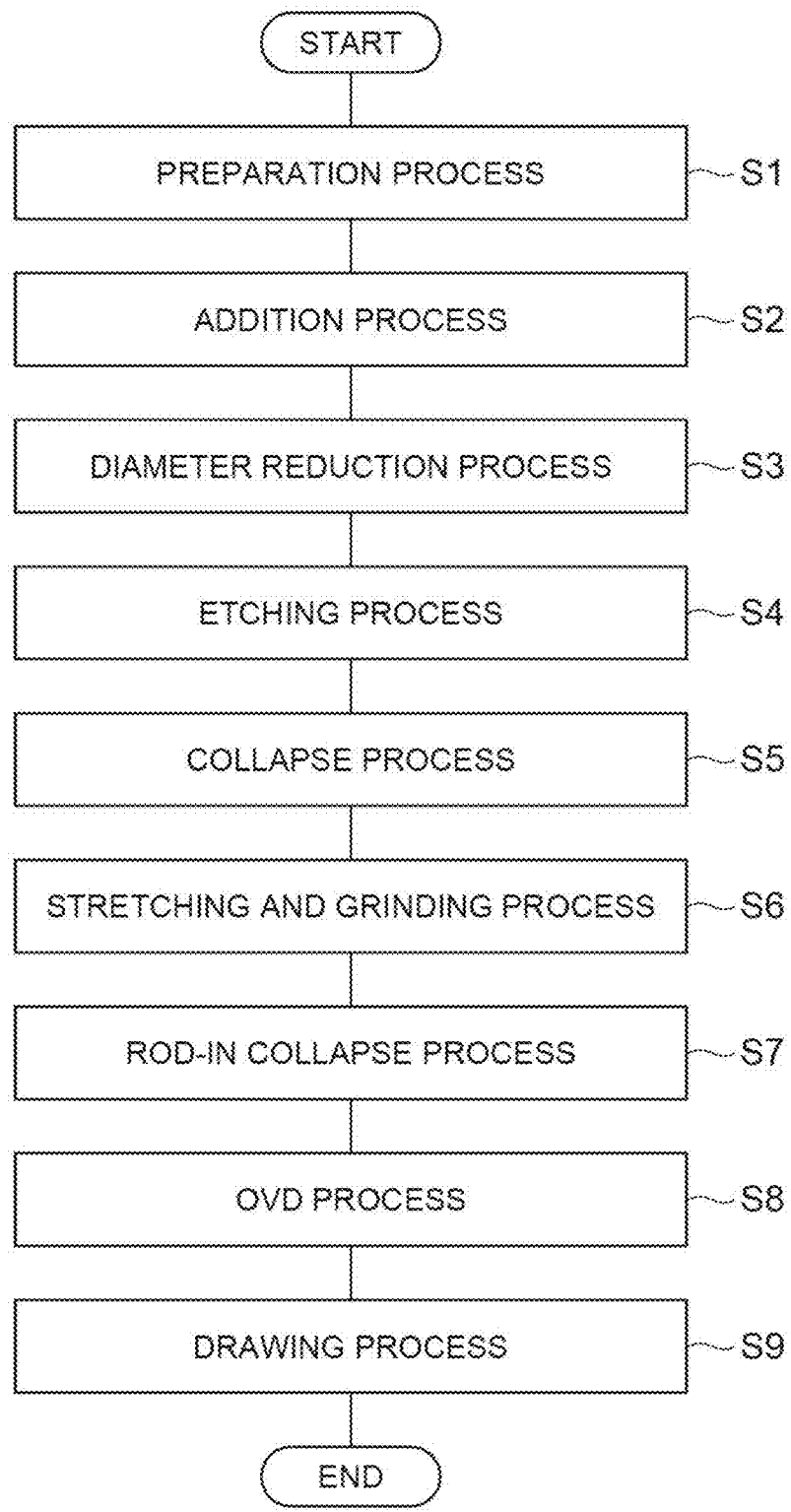
FIG. 1 is a flowchart illustrating a method for manufacturing an optical fiber according to an embodiment.

Problem to be Solved by Present Disclosure

In the methods described in Patent Literatures 1, 2, and 3, after an alkali metal element or an alkaline earth metal element starts to be added to an inner surface of a glass pipe, crystallization of glass occurs, and the portion may become a defective portion. In addition, there is a case where fine particles are scattered from the crystal and a defective portion spreads to other portions.

An object of the present disclosure is to provide a method for manufacturing an optical fiber preform and an optical fiber preform capable of improving productivity while suppressing transmission loss.

Effect of Present Disclosure

According to the present disclosure, an optical fiber capable of reducing transmission loss can be provided.

Description of Embodiment of Present Disclosure

First, embodiments of the present disclosure are listed and described. A method for manufacturing an optical fiber preform according to an embodiment of the present disclosure includes: adding an alkali metal element or an alkaline earth metal element to an inner surface of a glass pipe made of silica-based glass; reducing a diameter of the glass pipe after the adding; etching an inner surface of a continuous section of the glass pipe in a longitudinal direction after the reducing; and collapsing the glass pipe after the etching. At least one of the adding, the reducing, the etching, and the collapsing includes performing a local etching on an inner surface of a section of the glass pipe that is shorter than the continuous section. Here, "local etching" means etching limited to one or a plurality of sections that is shorter than a certain range of a certain length and that is within or outside the range of the certain length in which the heat source moves when performing the adding, the reducing, the etching, and the collapsing. Even in a non-local etching process, the amount of glass to be etched is not constant due to a change in the moving speed of the heat source or a change in the flow of the etching gas, and there is a minute change in the amount of glass to be etched. However, the local etching is performed by intentionally changing conditions such as a heat source temperature, an etching gas flow rate, and a heat source moving speed during the adding, the reducing, the etching, and the collapsing, or is additionally performed among the adding, the reducing, the etching, and the collapsing.

A method for manufacturing an optical fiber preform according to another embodiment of the present disclosure includes: adding an alkali metal element or an alkaline earth metal element to an inner surface of a glass pipe made of silica-based glass; reducing a diameter of the glass pipe after the adding; etching an inner surface of a continuous section of the glass pipe in a longitudinal direction after the reducing; collapsing the glass pipe after the etching; and performing a local etching on an inner surface of a section of the glass pipe that is shorter than the continuous section at least one of between the adding and the reducing, between the reducing and the etching, and between the etching and the collapsing.

In the method for manufacturing an optical fiber preform according to any of the embodiments, a defective portion such as crystallization generated on the inner surface of the glass pipe can be removed. Therefore, it is possible to suppress enlargement of the defective portion due to enlargement of generated crystals and increase of the number of defective portions due to generation of crystals in other portions by fine particles scattered from the crystals. As a result, the productivity can be improved while suppressing the transmission loss by adding the alkali metal element or alkaline earth metal element.

The local etching may be performed on one or more places in the continuous section. In this case, a defective portion such as crystallization generated in a portion to be a product can be removed.

The local etching may be performed on one or more places other than the continuous section. In this case, a defective portion such as crystallization generated in a portion other than a portion to be a product can be removed.

An optical fiber preform according to an embodiment of the present disclosure includes: a core portion made of silica-based glass and including an alkali metal element or an alkaline earth metal element. A concentration of the alkali metal element or the alkaline earth metal element in the core portion differs at a portion of a longitudinal direction, with respect to a place other than the portion.

In this optical fiber preform, the concentration of the alkali metal element or the alkaline earth metal element is locally lowered due to the influence of the local etching. However, the difference in transmission loss in the wavelength 1550 nm between an optical fiber derived from a portion that is performed the local etching and an optical fiber derived from a portion that is not performed the local etching is small.

An optical fiber preform according to an embodiment of the present disclosure includes: a core portion made of silica-based glass and including an alkali metal element or an alkaline earth metal element. The core portion includes bromine in a portion or all in a longitudinal direction.

In this optical fiber preform, due to the local etching, the glass viscosity can be reduced by the influence of the addition of bromine, and the transmission loss is reduced compared with the case where bromine is not added.

Details of Embodiment of Present Disclosure

Specific examples of a method for manufacturing an optical fiber preform and an optical fiber preform of the present disclosure will be described below with reference to the drawings. It should be noted that the present disclosure is not limited to these examples but is defined by the scope of the claims, and is intended to include meanings equivalent to the claims and all modifications within the scope. In the description of the drawings, the same elements will be denoted by the same reference signs, and duplicate description thereof will be omitted.

FIG. 1 is a flowchart illustrating a method for manufacturing an optical fiber according to the present embodiment. In the following description, an example of specific conditions is also described. The optical fiber is manufactured through a preparation process S1, an addition process S2, a diameter reduction process S3, an etching process S4, a collapse process S5, a stretching and grinding process S6, a rod-in collapse process S7, an outside vapor deposition (OVD) process S8, and a drawing process S9 in order. An optical fiber preform 10 (see FIG. 3) is manufactured through the preparation process S1, the addition process S2, the diameter reduction process S3, the etching process S4, the collapse process S5, the stretching and grinding process S6, the rod-in collapse process S7, and the OVD process S8. That is, the method for manufacturing an optical fiber preform according to the present embodiment includes the preparation process S1, the addition process S2, the diameter reduction process S3, the etching process S4, the collapse process S5, the stretching and grinding process S6, the rod-in collapse process S7, and the OVD process S8.

The preparation process S1 is a step of preparing a glass pipe into which an alkali metal group as a dopant is to be diffused. Here, the alkali metal group is a general term for an alkali metal element and an alkaline earth metal element. The glass pipe is made of silica (quartz)-based glass. The silica-based glass rod serving as a base of the glass pipe is manufactured by, for example, a vapor phase axial deposition (VAD) method. The cylindrical body is perforated and then stretched to produce a pipe. The silica-based glass rod from which the glass pipe is derived contains a certain concentration of chlorine and fluorine. The mass fraction of other dopants and impurities is less than 10 ppm. Here, the mass fraction is the ratio of the mass of the element of interest to the total mass, and is represented by (mass of element of interest)/(total mass). Hereinafter, the mass fraction is referred to as "concentration".

The outer radius (2d) of the glass pipe is 30 mm or more and 50 mm or less. The inner diameter (2i) of the glass pipe is 10 mm or more and 30 mm or less. The glass pipe contains chlorine having an average concentration of 0 or more and 2500 ppm or less and fluorine having an average concentration of 1000 ppm or more and 5000 ppm or less. The concentration of dopants and impurities other than chlorine and fluorine in the glass pipe is 10 ppm or less. Here, for example, in the case of an average chlorine concentration, the average concentration is a concentration represented by the following equation.

$$\frac{2\int_i^d Cl(r)\cdot r\cdot dr}{d^2 - i^2} \qquad \text{[Equation 1]}$$

In the above equation, Cl (r) represents a local chlorine concentration at a position of a radius r, i represents the inner radius of the glass pipe, and d represents the outer radius of the glass pipe. In the case of glass rod, the average concentration can be expressed by the above equation by setting i to 0 and d to the outer radius of the glass rod. The local concentration is measured by an electron probe micro analyzer (EPMA) as a concentration at each position along a straight line passing through the center position on a certain end surface of the glass pipe and the glass rod. The conditions of measurement by EPMA are, for example, an acceleration voltage of 20 kV, a probe beam size of 1 µm or less, and a measurement interval of 100 nm or less.

The addition process S2 is a step of adding an alkali metal group to the inner surface of a glass pipe made of silica-based glass. When a potassium (K) element is added as a dopant of the alkali metal group, for example, potassium bromide (KBr) of 6 g or more and 20 g or less is used as a raw material. Depending on the type of alkali metal group to be added, one or more of KBr, potassium iodide (KI), rubidium bromide (RbBr), rubidium iodide (RbI), and the like may be used as the raw material.

Figure 2:
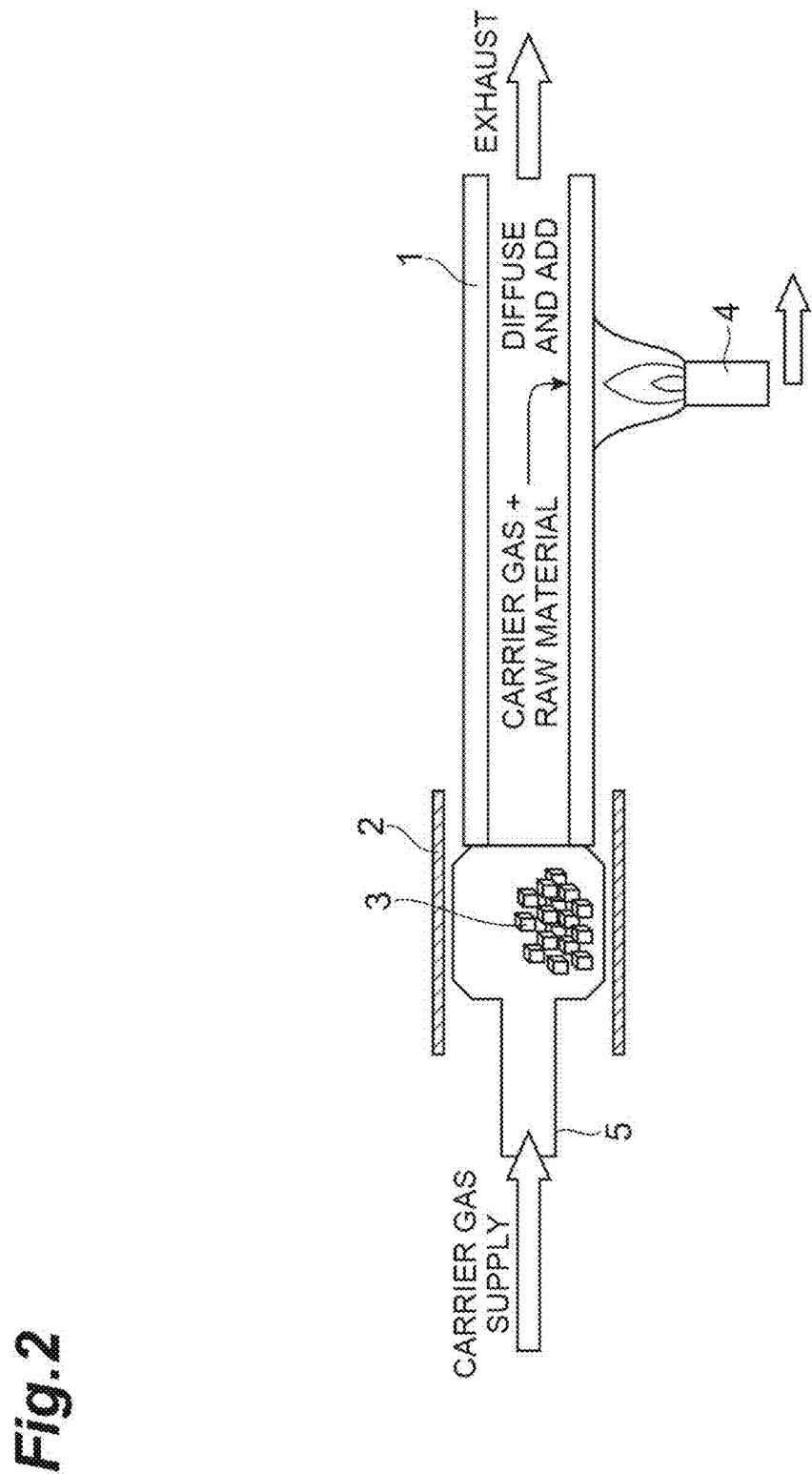
FIG. 2 is a diagram illustrating an addition step.

FIG. 2 is a diagram illustrating an addition step. As shown in FIG. 2, a handling glass pipe 5 disposed in an electric furnace 2 is connected to one end of a glass pipe 1. A part of the handling glass pipe 5 is used as a raw material reservoir, and a raw material 3 is placed therein. A part of the glass pipe 1 may be used as a raw material reservoir. An oxyhydrogen burner 4 is disposed outside the glass pipe 1. The electric furnace 2 is an external heat source for heating the raw material 3, and the oxyhydrogen burner 4 is an external heat source for heating the glass pipe 1. Instead of the oxyhydrogen burner 4, an induction furnace, a resistance furnace, or the like may be used.

The raw material 3 is heated to a temperature of 700° C. or more and 850° C. or less by an electric furnace 2 to generate raw material vapor. While the generated raw material vapor is introduced into the glass pipe 1 together with a carrier gas composed of oxygen, the glass pipe 1 is heated from the outside by the oxyhydrogen burner 4. The flow rate of the carrier gas is set to be equal to or more than 1 SLM (volume of gas flowing per minute in a standard state (25° C., 100 kPa)) and equal to or less than 3 SLM. In the addition process S2, the glass pipe 1 is heated by moving the oxyhydrogen burner 4 (external heat source) along the longitudinal direction of the glass pipe 1. The heating of the glass pipe 1 is performed by traversing the oxyhydrogen burner 4 at a speed of 30 mm/min or more and 60 mm/min or less for a total of 8 turns or more and 15 turns or less so that the temperature of the outer face of the glass pipe 1 becomes 1400° C. or more and 2000° C. or less. Thus, the alkali metal group is diffused and added to the inner surface of the glass pipe 1.

The diameter reduction process S3 is a step of reducing the diameter of the glass pipe to which the alkali metal group has been added after the addition process S2. At this time, the glass pipe is heated from the outside by an external heat source while flowing 0.5 SLM or more and 1.0 SLM or less of oxygen into the glass pipe. In the diameter reduction process S3, the external heat source is moved along the longitudinal direction of the glass pipe to heat the glass pipe. The heating of the glass pipe is performed by traversing the external heat source in a total of 6 turns or more and 10 turns or less so that the outer surface of the glass pipe becomes 1300° C. or more and 2000° C. or less. As a result, the inner diameter of the glass pipe is reduced to 3 mm or more and 5 mm less.

The etching process S4 is a step of etching the inner surface of a continuous section in the longitudinal direction of the glass pipe after the diameter reduction process S3. At this time, while a mixture gas of $SF_6$ (0.2 SLM or more and 0.4 SLM or less) and chlorine (0.5 SLM or more and 1.0 SLM or less) into the inside of the glass pipe, vapor phase etching is performed by heating the glass pipe from the outside by an external heat source. By doing so, the inner surface of the pipe containing the impurity added together with the target dopant at a high concentration can be etched, and the impurity can be removed. In the etching process S4, the external heat source is moved along the longitudinal direction of the glass pipe to heat the glass pipe. The heating of the glass pipe is performed by traversing the external heat source in a total of 1 turn or more and 5 turns or less so that the outer surface of the glass pipe becomes 1300° C. or more and 2000° C. or less.

The collapse process S5 is a step of collapsing the glass pipe after the etching process S4. A mixture gas of oxygen (1.1 SLM or more and 0.5 SLM or less) and He (0.5 SLM or more and 1.0 SLM or less) is introduced into the inside of the glass pipe, and the absolute pressure in the glass pipe is reduced to 97 kPa or less while the surface temperature is set to 2000° C. or more and 2300° C. or less to collapse the glass pipe. As a result, the glass pipe is solid, and a glass rod (solid body) having a radius (outer radius) of 20 mm or more and 40 mm or less is obtained.

In the stretching and grinding process S6, the glass rod is stretched to have diameter of 20 mm or more and 25 mm or less, and the outer peripheral portion of the glass rod is ground to have diameter of 15 mm or more and 20 mm or less. The glass rod (core rod) thus obtained becomes a core portion 11 (see FIG. 3) of the optical fiber preform 10. A core layer containing no alkali metal group may be provided around the core portion 11 by a known method such as an OVD method or a collapse method.

In the rod-in collapse process S7, a first cladding portion 12 (see FIG. 3) is provided outside the core portion 11. At this time, a rod-in collapse method is used in which the core portion 11 is inserted into a glass pipe of silica-based glass containing fluorine, and both are heated and integrated by an external heat source. As a result of the addition of the first cladding portion 12 by the rod-in collapse method, it is possible to suppress the water content of the core portion 11 and the first cladding portion 12 in the vicinity of the first cladding portion 11 to be sufficiently low.

In the OVD process S8, a rod in which the core portion 11 and the first cladding portion 12 are integrated is stretched to have a predetermined radius, and then a second cladding portion 13 (see FIG. 3) containing fluorine is synthesized on the outside of the rod by the OVD method to manufacture the optical fiber preform 10.

In the drawing process S9, optical fiber can be obtained by drawing the optical fiber preform 10. The drawing speed is 800 m/min or more and 2300 m/min or less, and the drawing tensile force is, for example, 0.5 N.

As described above, in the addition process S2, the alkali metal group is added to the inner surface of the glass pipe. The glass pipe contains chlorine and fluorine in order to suppress glass defects and adjust the refractive index. Therefore, chlorides, fluorides, and the like of the alkali metal group are produced, and silica glass in the periphery may be crystallized with these as nuclei. When the crystallization of silica glass is left to proceed with the addition process S2, the size of the crystal becomes large, so that the size of the defective portion becomes large and the yield is lowered. In addition, the defective portion (crystal portion) may scatter fine particles of glass or the like to generate crystals with the fine particles as nuclei at other places. As a formation process of the defective portion, there are various cases including not only a case caused by chloride, fluoride, or the like but also a case in which a minute foreign matter flowing from the upstream side of the glass pipe becomes a nucleus.

The above-described crystallizing may occur in any process from the addition process S2 to the collapse process S5. The problems are that a defective portion is enlarged due to an increase in size of the generated crystal, and that the number of defective portions is increased due to generation of crystals at other places by fine particles scattered from the crystal.

Therefore, in the method for manufacturing an optical fiber preform according to the present embodiment, when a defect such as crystallization occurs, the local etching is additionally performed only on the inner surface of a section shorter than the continuous section of the glass pipe in order to remove a defective portion such as a crystal portion. The local etching is performed in at least one of the addition process S2, the diameter reduction process S3, the etching process S4, and the collapse process S5. The local etching may be performed at least one of between the addition process S2 and the diameter reduction process S3, between the diameter reduction process S3 and the etching process S4, and between the etching process S4 and the collapse process S5.

By additionally performing the local etching, it is possible to suppress the expansion of the defective portion which is the abnormal portion and the increase in the number of defective portions due to the occurrence of the defective portion at other places. Many abnormal portions scatter light differently from normal portions. Therefore, by irradiating light and detecting scattered light, it is possible to specify the abnormal portion. The local etching may be performed until light scattering due to the abnormal portion is not observed. However, even if the abnormal portion is not completely removed, scattering to other places may be suppressed by reducing the size of the abnormal portion.

At a portion where the local etching has been performed, the alkali metal group added in the addition process S2 may be removed by etching, and the concentration of the alkali metal group may change locally. As a result, there may be a difference between the transmission loss characteristic of the locally etched portion and the transmission loss characteristic of the other portion. However, even in this case, since only portions having different characteristics become defective portions in the optical fiber after drawing, a reduction in yield can be minimized. Therefore, the productivity can be improved while suppressing the transmission loss by adding the alkali metal group.

The local etching is performed at one or more positions within the travel range of the external heat source such as the oxyhydrogen burner in the addition process S2, the diameter reduction process S3, and the etching process S4. The local etching is effective for an abnormal portion such as a crystal, the abnormal portion being generated not only within the travel range of the external heat source but also outside the travel range of the external heat source. This is because there is a case where fine particles scatter from an abnormal portion generated outside the travel range of the external heat source to cause crystals at other places.

Therefore, the local etching may be performed on one or more places outside the travel range of the external heat source such as the oxyhydrogen burner in the addition process S2, the diameter reduction process S3, and the etching process S4.

The local etching is vapor phase etching, and is performed by heating the glass pipe with an external heat source while introducing a mixture gas of $SF_6$ (0.1 SLM or more and 0.4 SLM or less) and chlorine (0.5 SLM or more and 1.0 SLM or less) into the glass pipe. The local etching may be performed in a state where the external heat source is fixed to the position of the abnormal portion, or may be performed while traveling the external heat source. As the etching gas, a mixture gas of $SF_6$ and bromine may be used instead of the mixture gas of $SF_6$ and chlorine. When the local etching is performed in the addition process S2, the diameter reduction process S3, the etching process S4, or the collapse process S5, the gas flowing in the step may be temporarily stopped and the $SF_6$ and chlorine may be flowed at the above-described flow rates to perform the local etching. The local etching is performed in a state where the surface temperature of the pipe is set to 1000° C. or more and 1500° C. or less by the external heat source.

Figure 3:
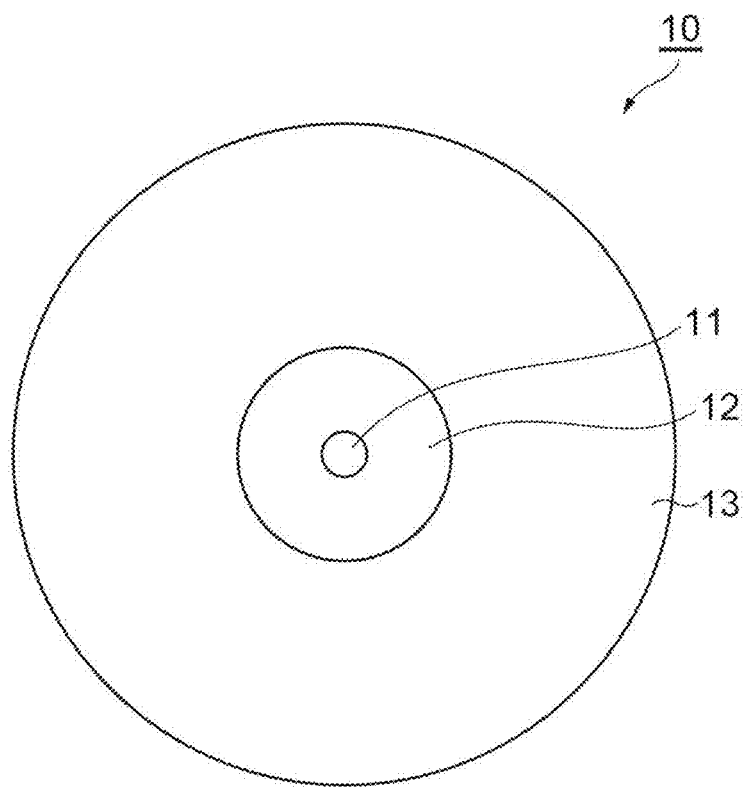
FIG. 3 is a cross-sectional view of an optical fiber preform according to an embodiment.

FIG. 3 is a cross-sectional view of an optical fiber preform according to an embodiment. As shown in FIG. 3, the optical fiber preform 10 includes the core portion 11, the first cladding portion 12, and the second cladding portion 13. The core portion 11 is made of silica-based glass. The core portion 11 includes an alkali metal group, chlorine, and fluorine. The average concentration of the alkali metal group in the core portion 11 is 10 ppm or more and 100 ppm or less. The average concentration of chlorine in the core portion 11 is 50 ppm or more and 2000 ppm or less. The average concentration of fluorine in the core portion 11 is 2000 ppm or more and 3500 ppm or less. Since local etching is additionally performed in the manufacturing process, the concentration of the alkali metal group in the core portion 11 is different in a portion in the longitudinal direction with respect to the other portion. In the core portion 11, the concentration of the alkali metal group in the portion where the local etching is performed is lower than the concentration of the alkali metal group in the other portion. When the local etching is performed by using a mixture gas of $SF_6$ and bromine, the core portion 11 contains bromine in a part or all of the longitudinal direction. Bromine is contained in the center of the core portion 11.

The first cladding portion 12 is provided outside the core portion 11 and surrounds the core portion 11. The first cladding portion 12 is made of silica-based glass. The first cladding portion 12 contains fluorine. The difference in refractive indexes between the core portion 11 and the first cladding portion 12, normalized by the refractive index of pure silica glass, is about 0.34% at the maximum.

The second cladding portion 13 is provided outside the first cladding portion 12, and surrounds the first cladding portion 12. The second cladding portion 13 is made of silica-based glass. The second cladding portion 13 contains fluorine.

Experimental examples will be described below with reference to Tables 1 to 5.

Table 1 summarizes the specifications and evaluation results of the experimental examples 1 to 6. "Cl conc. [ppm]" in Table 1" indicates the average chlorine concentration contained in the glass rod after the collapse process S5. "F conc. [ppm]" indicates an average fluorine concentration contained in the glass rod after the collapse process S5. "K conc. [ppm]" indicates an average potassium concentration contained in the glass rod after the collapse process S5. "Number of abnormal portions" indicates the number of abnormal portions such as crystals remaining in the glass rod after the collapse process S5. "Local etching" indicates whether local etching is present, and the etching gas used if present. "Raw material" indicates a raw material used in the addition process S2.

TABLE 1

|  | Cl conc. [ppm] | F conc. [ppm] | K conc. [ppm] | Number of abnormal portions | Local etching | Raw material |
|---|---|---|---|---|---|---|
| Experimental example 1 | 150 | 2590 | 40 | 0 | No | KBr |
| Experimental example 2 | 570 | 2630 | 50 | 1 | No | KBr |
| Experimental example 3 | 1050 | 3000 | 45 | 3 | No | KBr |
| Experimental example 4 | 1520 | 3040 | 50 | 11 | No | KBr |
| Experimental example 5 | 1590 | 2950 | 45 | 3 | Yes (SF$_6$ + chlorine) | KBr |
| Experimental example 6 | 1530 | 2930 | 45 | 0 | Yes (SF$_6$ + chlorine) | KBr |

In the experimental examples 1 to 6, KBr of 15 g was used as a raw material in the addition process S2. In the experimental examples 1 to 4, local etching was not performed. From the evaluation results of the experimental examples 1 to 4, it was found that when local etching was not performed, the number of abnormal portions increased as the total value of the average chlorine concentration and the average fluorine concentration in the glass pipe increased.

In the experimental examples 5 and 6, the local etching was performed using a mixture gas of SF$_6$ and chlorine as an etching gas. The local etching may be performed immediately when an abnormality occurs, or may be performed after one or more certain processes. In the experimental example 5, the local etching was performed on abnormal portions within the travel range of the external heat source in the addition process S2, the diameter reduction process S3, and the etching process S4. In the experimental example 5, the number of abnormal portions could be reduced to three. In the experimental example 6, the local etching was performed on an abnormal portion generated not only within the travel range of the external heat source in the addition process S2, the diameter reduction process S3, and the etching process S4 but also outside the travel range. In the experimental example 6, the number of abnormal portions could be reduced to 0.

Optical fibers were obtained by drawing optical fiber preforms manufactured using the glass rods of the experimental examples 5 and 6. In the experimental examples 5 and 6 in which local etching was performed, an optical fiber having a transmission loss of 0.148 dB/km or more and 0.150 dB/km or less in wavelength 1550 nm was obtained over the entire length of the optical fiber preform. From this, it was found that there was no large difference in transmission loss between a portion where local etching was performed and a portion where local etching was not performed. The reason for this is presumed as follows. That is, since the potassium concentration decreases in a portion where the local etching is performed, the Rayleigh scattering loss increases. However, since the inner surface of the glass pipe is smoothed by being excessively heated, the loss caused by the structural irregularity in the subsequent collapse process S5 is reduced.

Table 2 summarizes the specifications and evaluation results of experimental examples 7 to 12. "Rb conc. [ppm]" in Table 2 indicates an average rubidium concentration contained in the glass rod after the collapse process S5. Other items are the same as those in Table 1. Similarly to the average chlorine concentration and the average fluorine concentration, the average rubidium concentration is obtained by the above-described equation after measuring a local concentration using the above-described EPMA.

TABLE 2

|  | Cl conc. [ppm] | F conc. [ppm] | K conc. [ppm] | Number of abnormal portions | Local etching | Raw material |
|---|---|---|---|---|---|---|
| Experimental example 7 | 140 | 2630 | 40 | 1 | No | RbBr |
| Experimental example 8 | 540 | 2620 | 50 | 2 | No | RbBr |
| Experimental example 9 | 1020 | 2980 | 45 | 5 | No | RbBr |
| Experimental example 10 | 1510 | 3010 | 40 | 10 | No | RbBr |
| Experimental example 11 | 1560 | 2960 | 50 | 2 | Yes (SF$_6$ + chlorine) | RbBr |
| Experimental example 12 | 1590 | 2940 | 45 | 1 | Yes (SF$_6$ + chlorine) | RbBr |

In the experimental examples 7 to 12, RbBr of 15 g was used as a raw material in the addition process S2. In the experimental examples 7 to 10, local etching was not performed. From the evaluation results of the experimental examples 7 to 10, it was found that when local etching was not performed, the number of abnormal portions increased as the total value of the average chlorine concentration and the average fluorine concentration in the glass pipe increased.

In the experimental examples 11 and 12, local etching was performed as in the experimental examples 5 and 6. In the experimental example 11, the local etching was performed on an abnormal portion within the travel range of the external heat source in the addition process S2 and the diameter reduction process S3. In the experimental example 11, the number of abnormal portions could be reduced to 2. In the experimental example 12, local etching was performed an abnormal portion generated not only within the travel range of the external heat source in the addition process S2, the diameter reduction process S3, and the etching process S4 but also outside the travel range. In the experimental example 12, the number of abnormal portions could be reduced to 1.

From the evaluation results of the experimental examples 7 to 12, it was found that the final number of abnormal portions can be reduced by the local etching not only for potassium but also for rubidium.

Table 3 summarizes the specifications and evaluation results of experimental examples 13 to 18. The items in Table 3 are the same as those in Table 1.

TABLE 3

|  | Cl conc. [ppm] | F conc. [ppm] | K conc. [ppm] | Number of abnormal portions | Local etching | Raw material |
|---|---|---|---|---|---|---|
| Experimental example 13 | 180 | 2890 | 60 | 1 | No | KI |
| Experimental example 14 | 510 | 2910 | 70 | 2 | No | KI |
| Experimental example 15 | 1010 | 3180 | 65 | 6 | No | KI |
| Experimental example 16 | 1530 | 3210 | 75 | 15 | No | KI |
| Experimental example 17 | 1570 | 3160 | 70 | 3 | Yes (SF$_6$ + chlorine) | KI |
| Experimental example 18 | 1550 | 3230 | 65 | 1 | Yes (SF$_6$ + chlorine) | KI |

In the experimental examples 13 to 18, KI of 15 g was used as a raw material in the addition process S2. In the experimental examples 13 to 16, the local etching was not performed. From the evaluation results of the experimental examples 13 to 16, it was found that when local etching was not performed, the number of abnormal portions increased as the total value of the average chlorine concentration and the average fluorine concentration in the glass pipe increased.

In the experimental examples 17 and 18, the local etching was performed as in the experimental examples 5 and 6. In the experimental example 17, the local etching was performed on an abnormal portion within the travel range of the external heat source in the addition process S2 and the diameter reduction process S3. In the experimental example 17, the number of abnormal portions could be reduced to 3. In the experimental example 18, the local etching was performed on an abnormal portion generated not only within the travel range of the external heat source in the addition process S2, the diameter reduction process S3, and the etching process S4 but also outside the travel range. In the experimental example 18, the number of abnormal portions could be reduced to 1.

From the evaluation results of the experimental examples 13 to 18, it was found that the final number of abnormal portions could be reduced by the local etching for not only bromide but also iodide.

Table 4 summarizes the specifications and evaluation results of experimental examples 19 to 24. "Rb conc. [ppm]" in Table 4 indicates an average rubidium concentration contained in the glass rod after the collapse process S5. Other items are the same as those in Table 1.

In the experimental examples 19 to 24, two kinds of materials of KBr and RbBr were used as the raw material and the total weight was unified to 15 g in the addition process S2. In the experimental examples 19 to 22, the local etching was not performed. From the evaluation results of the experimental examples 19 to 22, it was found that when local etching was not performed, the number of abnormal portions increased as the total value of the average chlorine concentration and the average fluorine concentration in the glass pipe increased.

In the experimental examples 23 and 24, the local etching was performed in the same manner as in the experimental examples 5 and 6. In the experimental example 23, the local etching was performed on an abnormal portion within the travel range of the external heat source in the addition process S2 and the diameter reduction process S3. In the experimental example 23, the number of abnormal portions could be reduced to 2. In the experimental example 24, the local etching was performed on an abnormal portion generated not only within the travel range of the external heat source in the addition process S2, the diameter reduction process S3, and the etching process S4 but also outside the travel range. In the experimental example 24, the number of abnormal portions could be reduced to 1.

Table 5 summarizes the specifications and evaluation results of experimental examples 25 to 30. "Br concentration [ppm]" in Table 5 indicates the bromine concentration detected from the center of the glass rod (solid body) after the collapse process S5. Other items are the same as those in Table 1. The bromine concentration is determined using the above-described EPMA.

TABLE 4

| | Cl conc. [ppm] | F conc. [ppm] | K conc. [ppm] | Rb conc. [ppm] | Number of abnormal portions | Local etching | Raw material |
|---|---|---|---|---|---|---|---|
| Experimental example 19 | 150 | 2510 | 30 | 50 | 1 | No | KBr + RbBr |
| Experimental example 20 | 560 | 2590 | 35 | 45 | 2 | No | KBr + RbBr |
| Experimental example 21 | 1090 | 2990 | 40 | 45 | 5 | No | KBr + RbBr |
| Experimental example 22 | 1540 | 3010 | 35 | 40 | 13 | No | KBr + RbBr |
| Experimental example 23 | 1530 | 2950 | 35 | 50 | 2 | Yes ($SF_6$ + chlorine) | KBr + RbBr |
| Experimental example 24 | 1540 | 3030 | 40 | 45 | 1 | Yes ($SF_6$ + chlorine) | KBr + RbBr |

TABLE 5

| | Cl conc. [ppm] | F conc. [ppm] | K conc. [ppm] | Rb conc. [ppm] | Number of abnormal portions | Local etching | Raw material |
|---|---|---|---|---|---|---|---|
| Experimental example 25 | 140 | 2620 | 45 | 0 | 2 | No | KBr |
| Experimental example 26 | 510 | 2670 | 50 | 0 | 3 | No | KBr |
| Experimental example 27 | 1090 | 2990 | 45 | 0 | 5 | No | KBr |
| Experimental example 28 | 1510 | 3000 | 50 | 0 | 11 | No | KBr |
| Experimental example 29 | 1540 | 3030 | 45 | 70 | 1 | Yes ($SF_6$ + bromine) | KBr |
| Experimental example 30 | 1540 | 3030 | 40 | 80 | 0 | Yes ($SF_6$ + bromine) | KBr |

In the experimental examples 25 to 28, KBr of 15 g was used as a raw material in the addition process S2. In the experimental examples 25 to 28, the local etching was not performed. In the experimental examples 29 and 30, the local etching was performed in the same manner as in the experimental examples 5 and 6 except that the etching gas was a mixture gas of $SF_6$ and bromine. In the experimental example 29, local etching was performed on an abnormal portion within the travel range of the external heat source in the addition process S2 and the diameter reduction process S3. In the experimental example 29, the number of abnormal portions could be reduced to 1. In the experimental example 30, the local etching was performed on an abnormal portion generated not only within the travel range of the external heat source in the addition process S2, the diameter reduction process S3, and the etching process S4 but also outside the travel range. In the experimental example 30, the number of abnormal portions could be reduced to 0.

From the evaluation results of the experimental examples 25 to 30, it is considered that it is important to remove the abnormal portion without depending on the etching gas type in order to reduce the final number of abnormal portions.

Optical fibers were obtained by drawing optical fiber preforms manufactured using the glass rods of the experimental example 29 and experimental example 30. In the portion where the local etching was not performed, the transmission loss in wavelength 1550 nm was 0.148 dB/km or more and 0.149 dB/km or less. On the other hand, in the locally etched portion, the transmission loss in the wavelength 1550 nm was 0.147 dB/km. The reason why the transmission loss of the locally etched portion was lower than the transmission loss of the locally unetched portion was considered to be that the addition of bromine lowered the glass viscosity and lowered the Rayleigh scattering loss.

REFERENCE SIGNS LIST

1: glass pipe, 2: electric furnace, 3: raw material, 4: oxyhydrogen burner (external heat source), 5: handling glass pipe, 10: optical fiber preform, 11: core portion, 12: first cladding portion, 13: second cladding portion.

The invention claimed is:

1. A method for manufacturing an optical fiber preform, the method comprising:
    adding an alkali metal element or an alkaline earth metal element to an inner surface of a glass pipe made of silica-based glass;
    reducing a diameter of the glass pipe after the adding;
    etching an inner surface of a continuous section of the glass pipe in a longitudinal direction after the reducing;
    collapsing the glass pipe after the etching; and
    performing a local etching on an inner surface of a section of the glass pipe that is shorter than the continuous section at least one of between the adding and the reducing, between the reducing and the etching, and between the etching and the collapsing,
    wherein the local etching is performed on one or more places other than the continuous section.

2. The method for manufacturing an optical fiber preform according to claim 1, wherein the glass pipe contains chlorine and fluorine.

3. The method for manufacturing an optical fiber preform according to claim 1, wherein in the local etching, vapor phase etching using a mixture gas of $SF_6$ and chlorine is performed.

4. The method for manufacturing an optical fiber preform according to claim 1, wherein in the local etching, vapor phase etching using a mixture gas of $SF_6$ and bromine is performed.

5. The method for manufacturing an optical fiber preform according to claim 1, wherein the local etching includes specifying an abnormal portion by irradiating the glass pipe with light and detecting scattered light.

6. The method for manufacturing an optical fiber preform according to claim 1, wherein in the adding, potassium is added as an alkali metal element.

7. The method for manufacturing an optical fiber preform according to claim 1, wherein in the adding, rubidium is added as an alkali metal element.

* * * * *